(12) United States Patent
Vincent et al.

(10) Patent No.: US 8,577,753 B1
(45) Date of Patent: Nov. 5, 2013

(54) COMMUNITY-BASED SHOPPING PROFILES

(75) Inventors: Brent Allen Vincent, Seattle, WA (US);
Ralph Howard Edson, III, Seattle, WA (US); Sean M. Scott, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 728 days.

(21) Appl. No.: 12/256,279

(22) Filed: Oct. 22, 2008

(51) Int. Cl.
*G06Q 30/00* (2006.01)
(52) U.S. Cl.
USPC ...... 705/26.7; 705/26.1; 705/26.61; 705/27.1
(58) Field of Classification Search
USPC ............. 705/26, 27, 26.1, 26.61, 26.7, 27.1
See application file for complete search history.

(56) References Cited

U.S. PATENT DOCUMENTS

| | | | |
|---|---|---|---|
| 7,013,238 B1 * | 3/2006 | Weare | 702/182 |
| 7,080,071 B2 * | 7/2006 | Henrion et al. | 1/1 |
| 7,295,995 B1 * | 11/2007 | York et al. | 705/26.8 |
| 7,890,363 B2 * | 2/2011 | Gross | 705/7.31 |
| 8,024,213 B1 * | 9/2011 | Fano et al. | 705/7.29 |
| 2002/0152163 A1 * | 10/2002 | Bezos et al. | 705/40 |
| 2005/0203807 A1 * | 9/2005 | Bezos et al. | 705/26 |
| 2005/0210285 A1 * | 9/2005 | Williams | 713/201 |
| 2006/0156326 A1 * | 7/2006 | Goronzy et al. | 725/13 |
| 2007/0050192 A1 * | 3/2007 | Gutta et al. | 705/1 |
| 2008/0208714 A1 * | 8/2008 | Sundaresan | 705/27 |
| 2009/0240555 A1 * | 9/2009 | Panje | 705/10 |

OTHER PUBLICATIONS www.amazon.com (retrieved from www.archive.org from various dates between Jan. 31, 2007 and Mar. 29, 2007) [retreived on Jun. 16-17, 2009].*
"Andromedia Introduces 'Click-to-Close Personalization' With LikeMinds Personalization Server 3.0," Business Wire [New York] Jul. 15, 1999: 1.*
The Paradox of Choice: Why More Is Less, http://en.wikipedia.org/wiki/The_Paradox_of_Choice:_Why_More_Is_Less, Website, Jul. 28, 2008, 5 pages.
The Wisdom of Crowds, http://en.wikipedia.org/wiki/The_Wisdom_of_Crowds, Website, Jul. 28, 2008, 8 pages.
Product Finder, http://en.wikipedia.org/w/index.php?title=Product_finder&oldid=217702948, Website, Jun. 7, 2008, 1 page.

* cited by examiner

*Primary Examiner* — Jeffrey A Smith
*Assistant Examiner* — Anne Georgalas
(74) *Attorney, Agent, or Firm* — Thomas | Horstemeyer, LLP

(57) ABSTRACT

Guided item selection based on profiles maintained dynamically. The profiles represent, for example, purchase, usage, or personality profiles corresponding to various segments of the user population. Each of the profiles has one or more items associated with the profile. The user selects one or more of the profiles while browsing or searching for items. The items associated with the selected profile are provided to the user. The user's interaction, or lack of interaction, with the items is monitored and analyzed. Based on the monitored interaction, a relevance of the selected profile relative to the other profiles is dynamically adjusted along with a relevance of particular items for the selected profile. For example, items may be added or removed from the list based on the monitored user interactions.

25 Claims, 11 Drawing Sheets

COMMUNITY-BASED SHOPPING PROFILES

BACKGROUND

Customers shop for products online in various ways. Some customers select product categories and narrow the selection until presented with a reasonable quantity of products to review. Other customers provide detailed search criteria to generate a list of matching products for review.

Still other customers provide generic and vague search terms and are presented with an overwhelming quantity of products to consider. These customers are more likely to visit local brick-and-mortar retail stores for their shopping needs, as retail stores have physical limitations on the quantity of products available for selection, thereby limiting the customer's choices. Because online shopping services may offer a huge selection of items, such online shopping services fail to effectively attract some of the customers who need greater assistance narrowing down their product selection.

Some online systems enable customers to create lists of favorite products for other customers to view as product suggestions. However, the lists are created and maintained by individual customers, and are generally static. Other systems enable customers to tag products with descriptive terms. These systems search for products by comparing the descriptive terms with keywords provided by the customers. However, identifying and correcting incorrect, inaccurate, or misleading descriptions can be difficult.

BRIEF DESCRIPTION OF THE DRAWINGS

FIG. 8 is an example user interface illustrating a description of profiles associated with a particular item category.

FIG. 10 is an example user interface illustrating profiles associated with product search results.

FIG. 11 is an example user interface illustrating profiles associated with product search results in an overlay on the user interface.

Corresponding reference characters indicate corresponding parts throughout the drawings.

DETAILED DESCRIPTION

Figure 1:
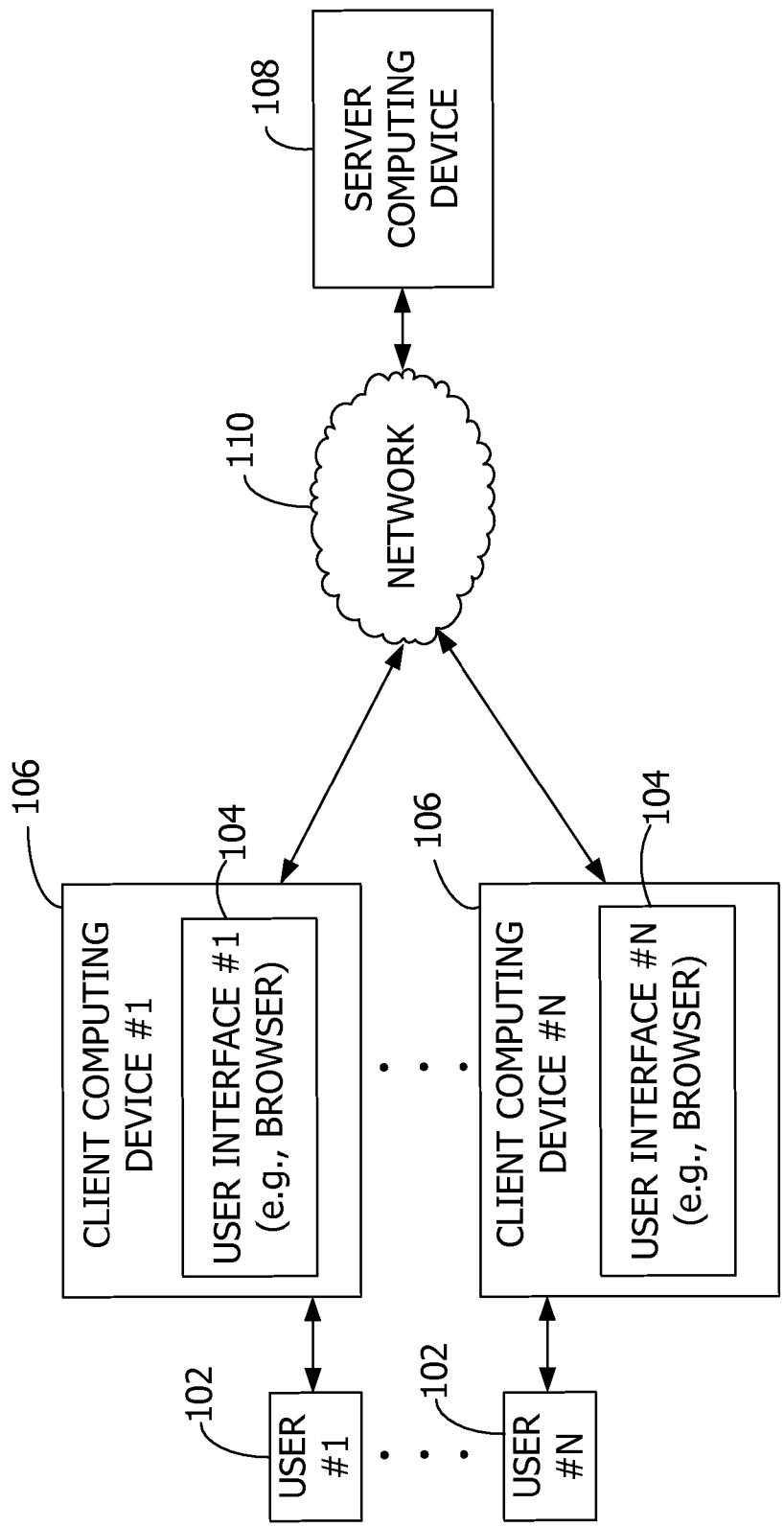
FIG. 1 is an example block diagram of a user of a client computing device interacting with a server computing device via a network.

Referring to the figures, disclosed embodiments aid users 102 of client computing devices 106 in selecting items based on a profile 206. The profiles 206 represent purchase profiles, usage profiles, personality profiles, and the like, and correspond to different segments of the user population. The items 302 associated with each of the profiles 206 include, for example, products, services, articles, news stories, social networking or personal profiles, and the like. In an embodiment in which the items 302 are products available for purchase, the profiles 206 may be dynamically maintained based on user shopping behavior. Embodiments provide the users 102 with an alternative to investing the effort to comprehend the significance and consequences of various browse paths. Further embodiments provide a profile-based, community-driven shopping aid intended to help shoppers find and discover products that best meet the needs of the shoppers, uninfluenced by merchandising interests.

FIG. 1 is an example block diagram of a user of a client computing device interacting with a server computing device via a network. Specifically, the users 102, such as user #1 through user #N, interact with user interfaces 104, such as user interface #1 through user interface #N, executing on the client computing devices 106 such as client computing device #1 through client computing device #N. The client computing devices 106 communicate with a server computing device 108 via a network 110. While the embodiment of FIG. 1 illustrates a client-server relationship between the computing devices, other configurations are contemplated such as a peer-to-peer relationship between the computing devices.

Figure 2:
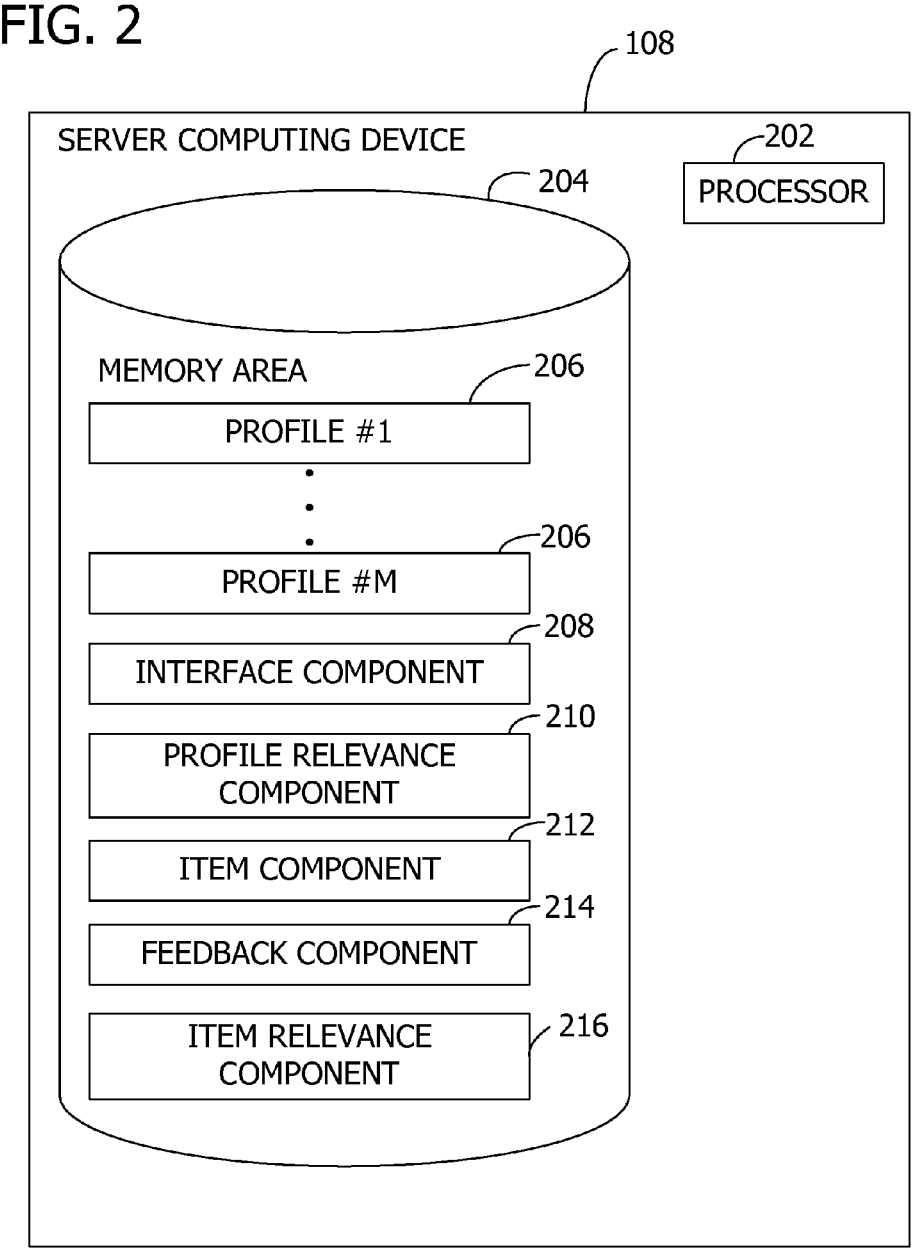
FIG. 2 is an example block diagram of the server computing device having a memory area storing profiles and computer-executable components.

Referring next to FIG. 2, an example block diagram illustrates the server computing device 108 having a memory area 204 storing the profiles 206 and computer-executable components. The memory area 204 stores a plurality of the profiles 206 such as profile #1 through profile #M. Separate profiles 206 may be created for male users, female users, casual users, expert users, eco-friendly users, etc.

An illustrative, non-limiting structure for the profiles 206 is described with reference to FIG. 3. In the embodiment illustrated in FIG. 3, each profile 206 has a title or description 306, a representative item image 308, a profile relevance factor 310, and one or more items 302 such as item #1 through item #P. The title or description 306 and the representative item image 308 are static attributes, in some embodiments, that are defined at the time of profile creation. In other embodiments, these attributes are dynamically modifiable based on, for example, feedback from the users 102. The profile relevance factor 310 relates the profile 206 to the other profiles 206 (e.g., based on popularity, ranking, etc.), or to other profiles 206 with a particular item category. In some embodiments, the profile relevance factor 310 is a weight. In such embodiments, popular profiles 206 are assigned a greater weight than less popular profiles 206. Popularity may be determined by, for example, frequency of access statistics.

Each of the items 302 has an item relevance factor 304 or score such as item relevance factor #1 through item relevance factor #P. The item relevance factor 310 relates the item 302 to the associated profile 206. The item relevance factor 304 is determined, for example, by user voting, sales rank of the item 302, user reviews of the item 302, a conversion rate of the item 302, explicit ranking obtained form item-level forums or discussion groups, or a weighted combination of any of the foregoing. For example, a greater weight is given to feedback from users 102 who are considered experts in a particular item category, while a lesser weight is given to unknown users 102 or those who otherwise are not considered to be particularly knowledgeable about the items in a particular category. In another example, the recency of product introduction also affects the item relevance factor 304. In some embodiments, the profile-specific product list is dynamically expanded (e.g., using a king-of-the-hill mechanism) to allow new and untested products to be introduced and evaluated on a continual basis.

In some embodiments, the item relevance factor 304 for each of the items 302 is stored per user 102. For example, if one user 102 favors a particular brand of item 302 over another brand, items 302 of that brand are weighted higher in the profiles 206 for the particular user 102.

Referring again to FIG. 2, the memory area 204 or other computer-readable media store computer-executable components for community-based profile maintenance. The components include an interface component 208, a profile relevance component 210, an item component 212, a feedback component 214, and an item relevance component 216. The interface component 208 receives an item or product category selection from the user 102 and identifies one or more of the profiles 206 based on the received product category selection. For example, the user 102 interacts with the user interface 104 to select a product category such as cameras, computers, or books. The interface component 208 includes, for example, a widget, overlay, popup, window, or other code or component for presenting and/or receiving information from the user 102.

The profiles 206 associated with the selected product categories are identified. The profile relevance component 210 ranks, sorts, or otherwise orders the identified profiles 206 based on ranking criteria. The ranking criteria is based on, for example, popularity, a click-through percentage of the particular profile (e.g., stored in real-time), a conversion rate associated with the items 302 listed in the profile 206, a quantity of users 102 viewing the profile 206, or other criteria. The ranking criteria may be combined or modified with a king-of-the-hill mechanism or the like to test statistics associated with a new profile 206. For example, new profiles may be displayed to users some percentage of the time to determine if the profile is one that may be more or less popular than established profiles. The ordered profiles 206 are provided to the client computing device 106 for display to the user 102 via the user interface 104. Only a subset of all the profiles may be provided for display according to their order or rank, for example.

The user 102 selects one of the profiles 206. Alternatively, one of the profiles 206 is selected automatically based on a guess of a particular profile that may be best suited for a user. For example, among other considerations, a purchase history of the user 102 may reveal that the user is an early adopter of new products and, thus, an early adopter profile that showcases newly released items may be displayed. Responsive to the selection, the item component 212 provides one or more items such as a list of the items 302 associated with the selected profile 206 to the user 102. The item relevance component 216 orders the list of items 302 based on criteria such as the ranking criteria used by the profile relevance component 210. The user 102 proceeds to interact with the list or perform various actions. For example, the user 102 may select and purchase one of the items 302, select and purchase an item not on the list, view details (e.g., product details or item information) for one of the items 302, recommend or vote for one or more other items to be included in the list, recommend or vote for removal of one of the items 302 from the list, or explicitly define a relevance of one of the items 302 with respect to the other items 302 on the list. Table 1 below shows illustrative user actions and the implications of those actions.

TABLE 1

Illustrative User Actions and Implications.

| User Action | Implication |
| --- | --- |
| Delete an item from the list | The item relevance factor is reduced |
| Add an item to the list | The item relevance factor is increased |
| Move an item higher in the list | The item relevance factor is increased |
| Add an item to shopping cart | The item relevance factor is increased |
| Buy an item in the same product type that is not currently assigned to the profile | The item is added to the profile |
| Move an attribute high in the list | The attribute's profile relevance is increased |
| Move an attribute down in the list | The attribute's profile relevance is reduced |

The feedback component 214 monitors the user interactions and user actions with the list of items 302 to continuously learn and make the list of items 302 more relevant to the users 102. For example, the feedback component 214 receives notification of the actions performed by the user 102, along with identification of the profile 206 currently associated with the user 102. The actions include, for example, explicit votes from the users 102. The feedback component 214 modifies the list of items 302 based on the monitoring to provide community-based maintenance of the profiles 206. For example, the feedback component 214 adjusts the item relevance factor 304 associated with one or more of the items 302 in the profile 206 based on the user actions. A value associated with the item relevance factor 304 may, for example, be increased or decreased based on the user actions. The user actions may include an explicit vote, or click-through purchase behavior or other indirect community feedback. In other embodiments, the feedback component 214 removes items 302 with a low conversion rate from the list (e.g., when the conversion rate reaches a pre-defined lower threshold), or adds items to the list that have been recommended for inclusion in the list by a pre-defined quantity of the users 102 (e.g., exceeding a predefined threshold).

In some embodiments, the feedback component 214 adjusts the profile relevance factor 310 for the profile 206 associated with the user 102 based on the monitored user interactions with the list of items 302. For example, the feedback component 214 increases or decreases the popularity, ranking, or other relationship of the profile 206 to the other profiles 206 (e.g., in the same product category).

A processor 202 associated with the server computing device 108 executes computer-executable instructions, or is otherwise programmed, to implement various embodiments such as the embodiments illustrated in the figures.

Figure 4:
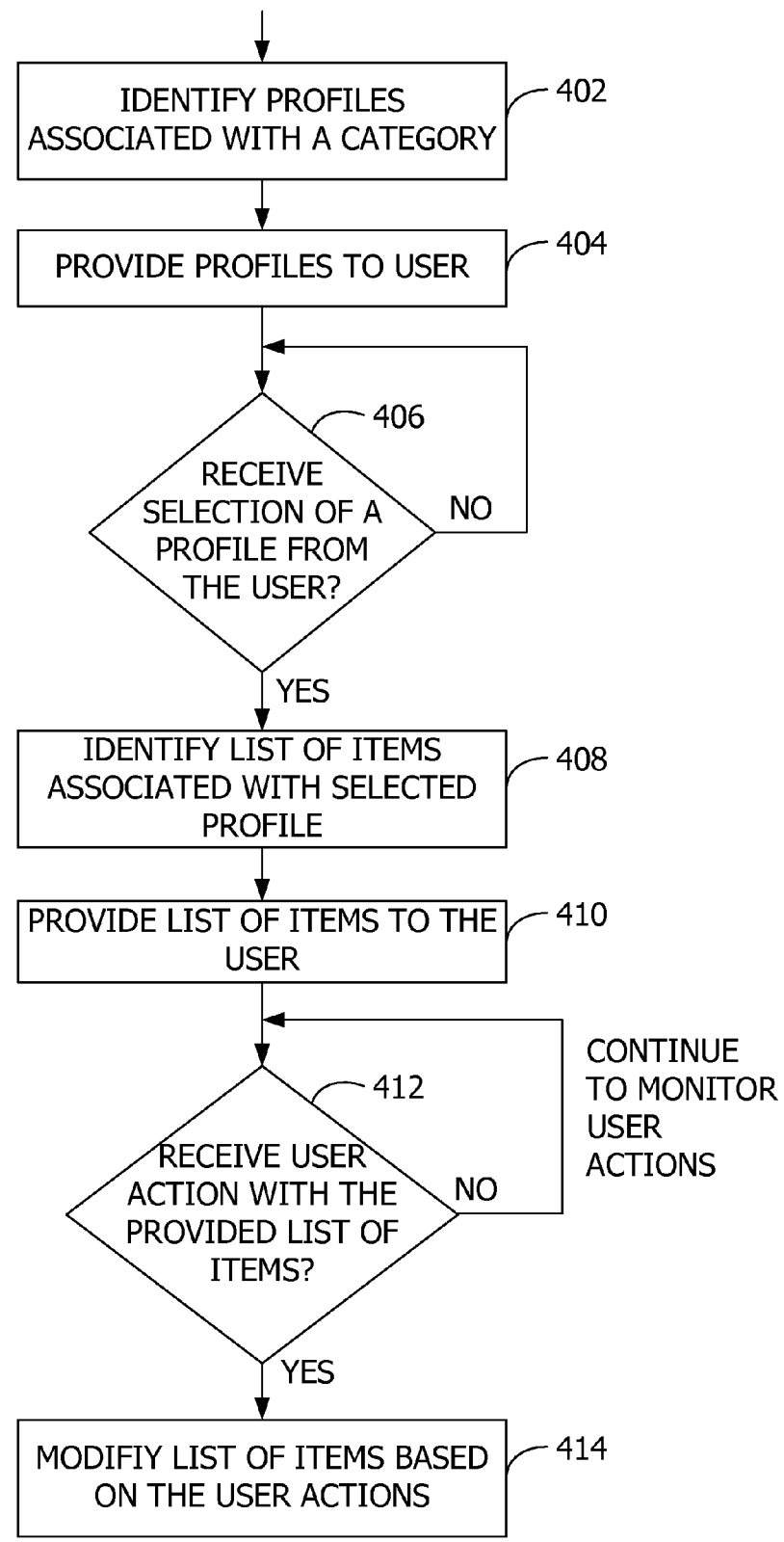
FIG. 4 is an example flow chart illustrating the monitoring of user actions with items associated with a profile.

Referring next to FIG. 4, an example flow chart illustrates the monitoring of user actions with items 302 associated with the profile 206. The operations described in FIG. 4 are performed by, for example, the server computing device 108. At 402, the profiles 206 associated with an item or product category are identified. The product category may be identified or selected by, for example, explicit input from the user 102 or a browsing history of the user 102. In some embodiments, the user 102 enters a query to search the available profiles 206. The query is performed to identify the profiles 206.

Alternatively or in addition, the profiles 206 are recommend for the user 102 based on a purchase history, browse history (e.g., list of items previously viewed by the user 102 during one or more previous sessions), profiles 206 previously selected by the user 102, or items previously selected or viewed or purchased by the user 102. For example, upon item selection, the following prompt may appear: "Your selected item is a member of the following profiles, you might want to check out other products within these profiles."

The identified profiles 206 are provided to the user 102 at 404 for selection. Upon receipt of a selection of the profiles 206 at 406, the list of items 302 associated with the selected profile 206 are identified at 408 and provided to the user 102 at 410. For example, the list of items 302 may be presented in a comparison grid illustrating differences or similarities between features associated with each item 302 in the list of items 302.

User interactions with the list of items 302 are monitored and received at 412. Alternatively or in addition, user interactions with items not in the list of items 302 may be monitored and/or received. Monitoring the user interactions includes, for example, storing and analyzing a purchase history of the user 102 and/or storing and analyzing a browsing history of the user 102. The list of items 302 is modified at 414 based on predefined criteria such as the received user interactions to dynamically maintain the selected profile 206.

Figure 5:
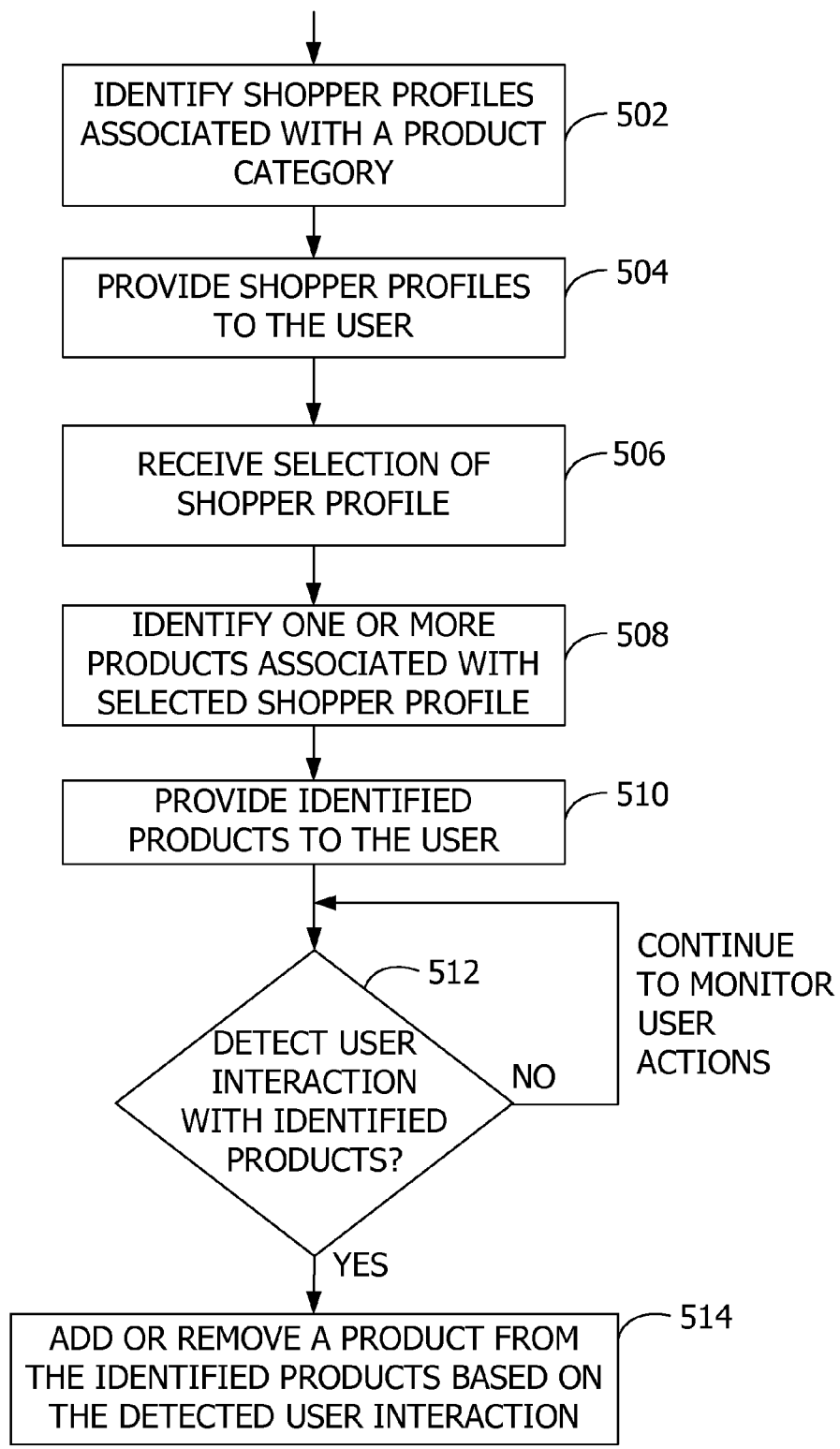
FIG. 5 is an example flow chart illustrating the addition or removal of items associated with a profile based on user interaction with the items.

Referring next to FIG. 5, an example flow chart illustrates the addition or removal of items associated with shopper profiles based on user interaction with the items. The operations illustrated in FIG. 5 enable community-based guided shopping. At 502, shopper profiles associated with a product category are identified and provided to the user 102 at 504. Upon receipt of a selection of one of the shopper profiles at 506, a one or more products are identified at 508 and provided to the user 102 at 510. User interaction with the products is detected at 512. Based on the user interactions, products are added to or removed from the list of products at 514. The item relevance may change based on the user activity. Other community-based maintenance operations are contemplated, such as described herein.

Figure 6:
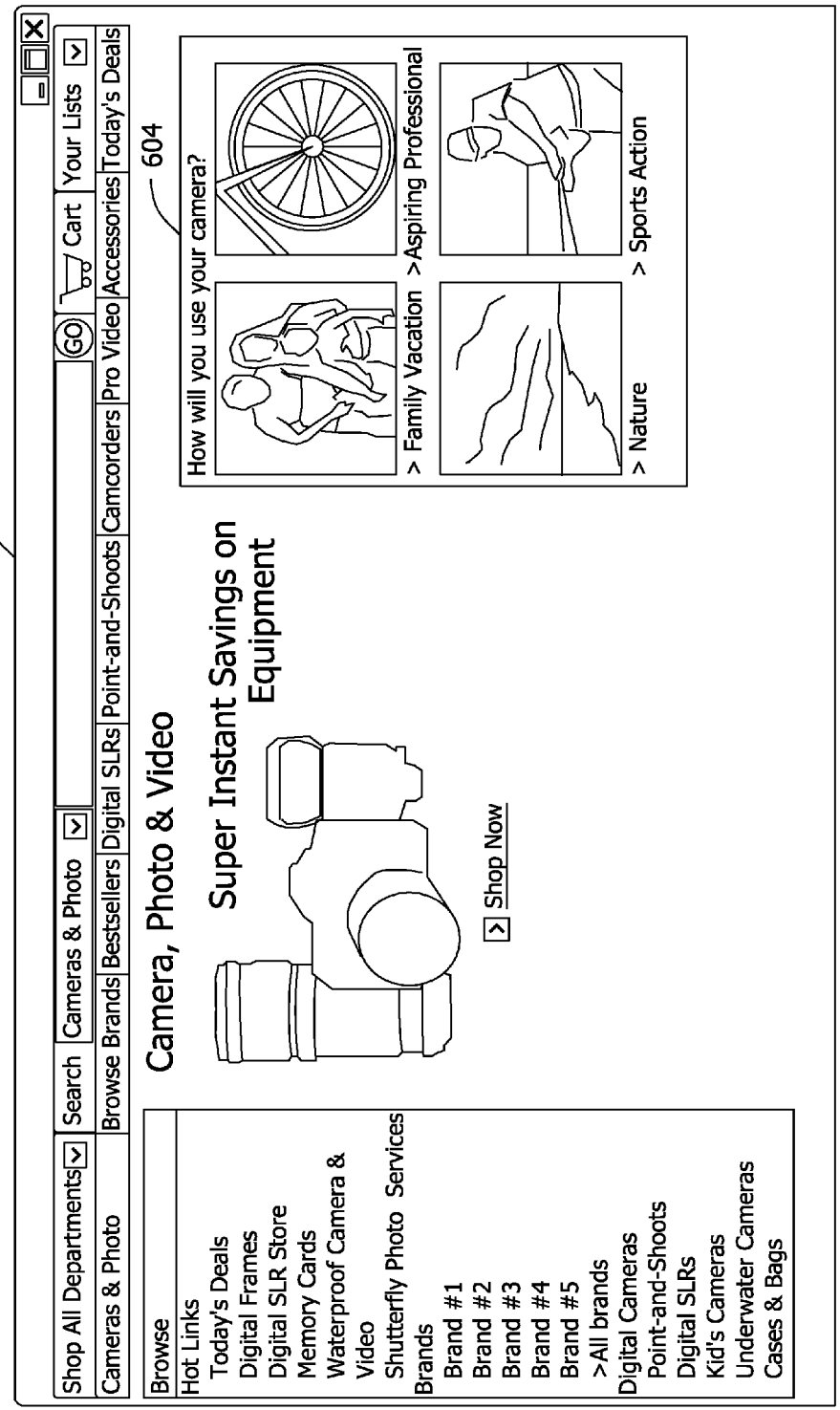
FIG. 6 is an example user interface illustrating profiles associated with a particular item category.

Referring next to FIG. 6, an example user interface 602 illustrates profiles associated with a particular product category. In the example of FIG. 6, the product category is "camera, photo, and video." The profiles selected to be displayed to the user that are associated with this product category are displayed in a portion 604 of the user interface 602. Although only four profiles are shown in the present example, there may be many others that are not displayed (e.g., those non-displayed profiles may have been determined to be less relevant to the category). The profiles may be ordered, for example, based on the profile relevance factor 310 for each of the profiles. Lifestyle images corresponding to the profiles, or a subset of the profiles, are displayed. Alternatively or in addition, the representative item images 308 for the profiles are displayed (not shown). Further, a component (not shown) of the user interface 602 allows the user 102 to view more profiles or create a new profile (not shown). For example, a button or link to "view more profiles" may be provided to the user in order to view and select additional profiles.

Figure 7:
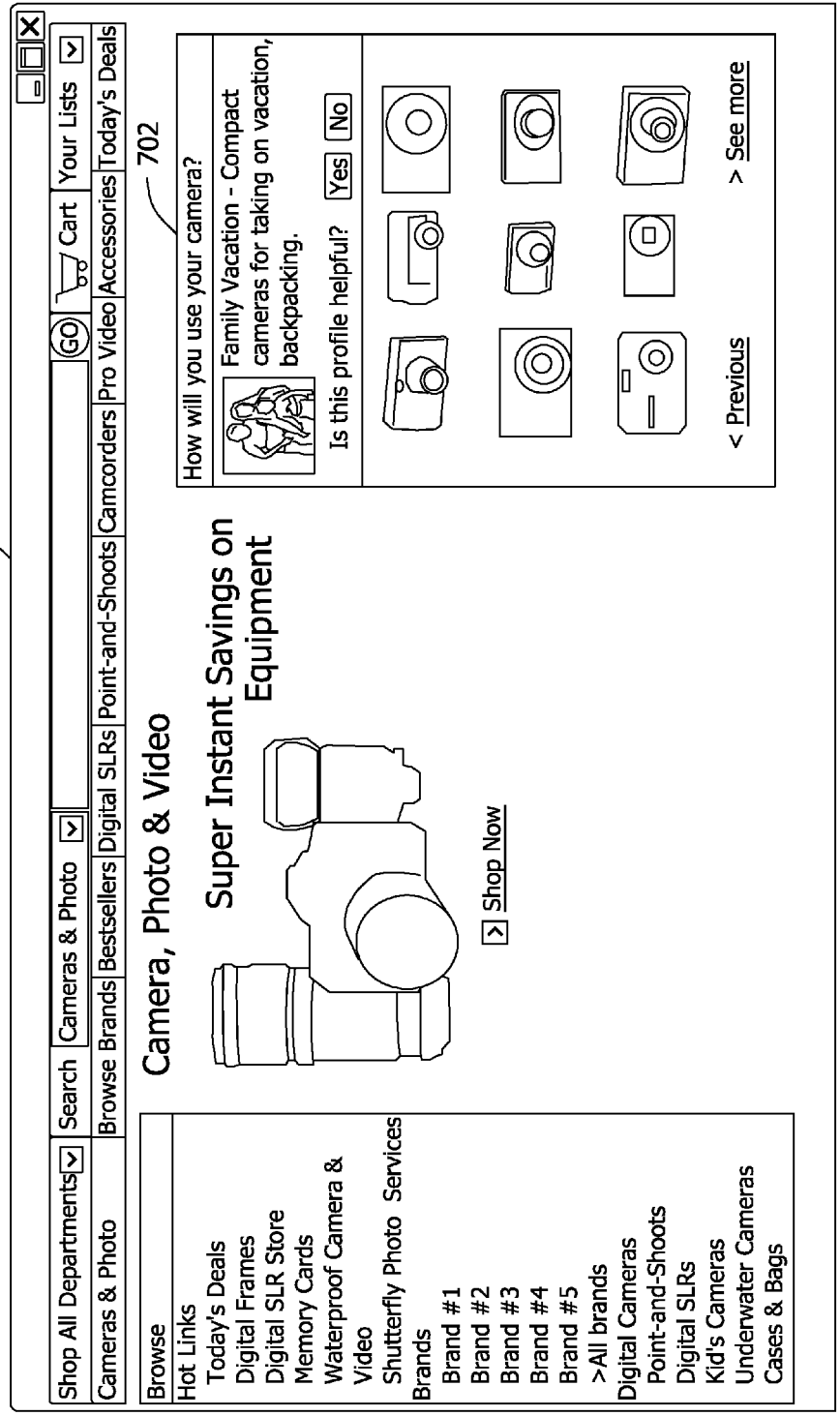
FIG. 7 is an example user interface illustrating a list of items associated with a selected profile.

Referring next to FIG. 7, the user interface 602 illustrates the display of various identified products associated with a selected profile. The products are shown in a portion 702 of the user interface 602 after the user 102 selects a profile such as shown in FIG. 6. The identified products may include a text-based description or identification of the items 302, a graphical representation of the products, or both. The list of products may be ordered, for example, based on the item relevance factor 304. After viewing the products, the user 102 may vote on the helpfulness of the selected profile via a component (not shown) of the user interface 602. The vote affects the profile relevance factor 310.

While viewing the list of products, the user 102 may hover a cursor over one of the products causing a popover to appear in the user interface 602. The popover includes, for example, product information or other product details (e.g., photos, specifications, etc.). The user 102 may also select a few of the products for comparison (e.g., feature comparison).

Figure 8:
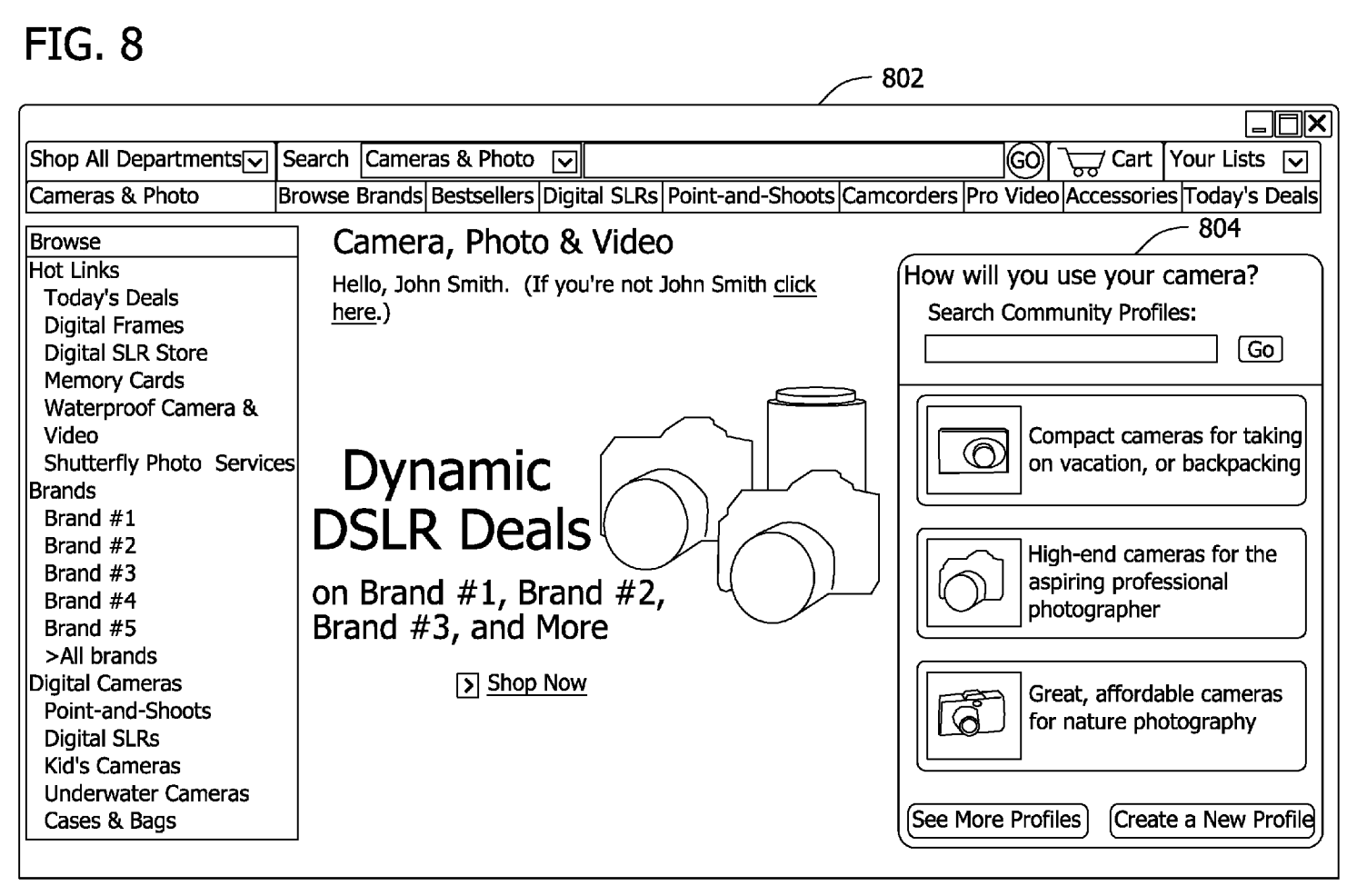

Referring next to FIG. 8, an example user interface 802 illustrates descriptions of the profiles associated with a particular product category. A portion 804 of the user interface 802 displays the descriptions and includes the representative item images for each of the displayed descriptions. The portion 804 includes user interface components (e.g., buttons) for viewing additional profiles and for creating a new profile.

Figure 9:
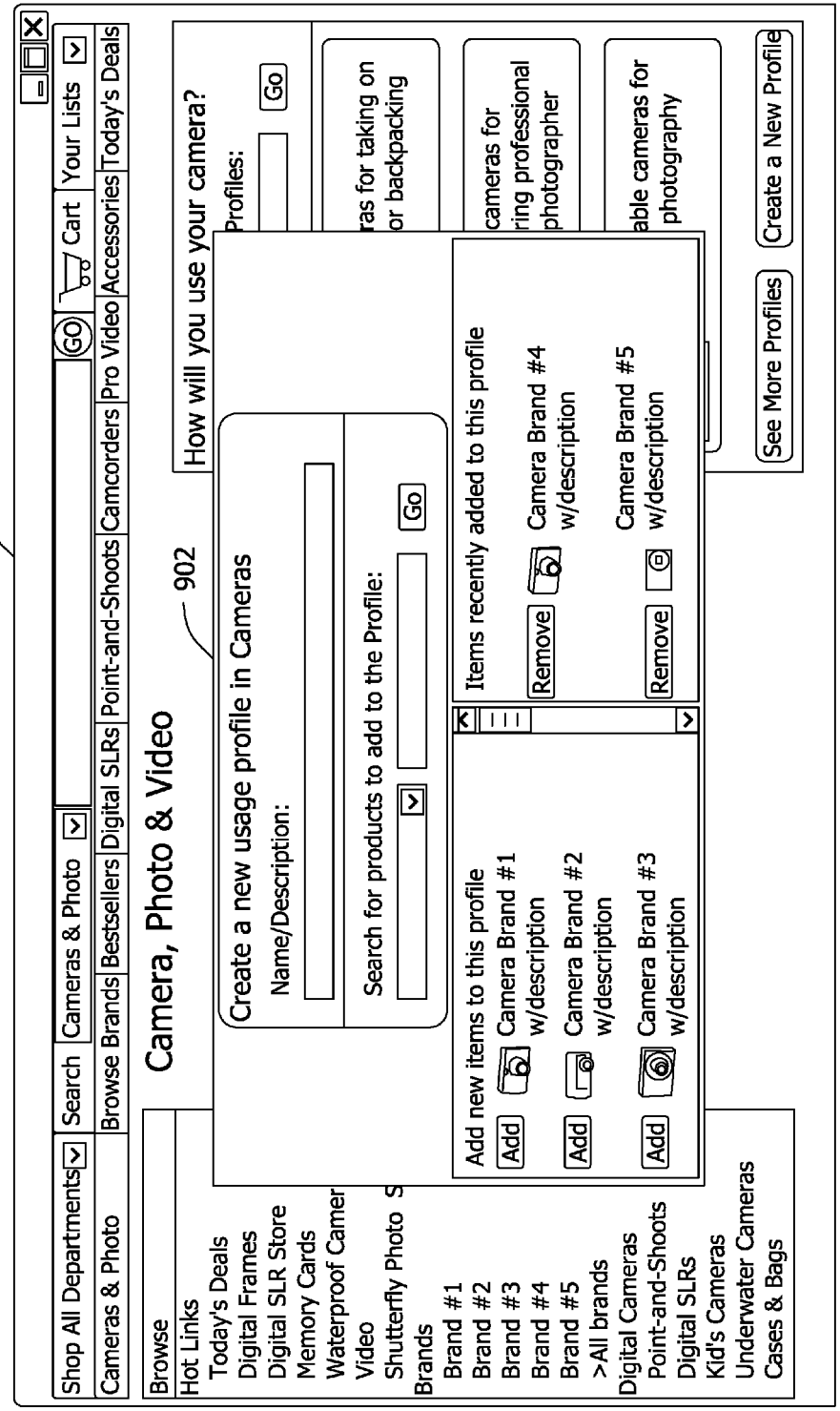
FIG. 9 is an example user interface illustrating the creation of a new profile and the addition of products to the profile.

Referring next to FIG. 9, the user interface 802 has a popover or other user interface overlay 902 that illustrates the creation of a new profile and the addition of products to the profile. The overlay 902 appears in the user interface 802 responsive to the user 102 requesting creation of a new profile, such as shown in FIG. 8. The overlay 902 includes options for entering the name of the new profile, adding products to the profile via search functionality, and displays recently added products to the profile. In some embodiments, the users 102 are rewarded for creating new profiles, and for originating profiles that ultimately have a high profile relevance factor 310. Compensation, rewards, or other incentives may be provided to the users 102 based on the contribution (and success of the contribution) of the users 102 to the community-based embodiment described herein. For example, the users may be compensated based on a commission earned on the products that are sold to other users that used the profile to making their product selection.

Figure 10:
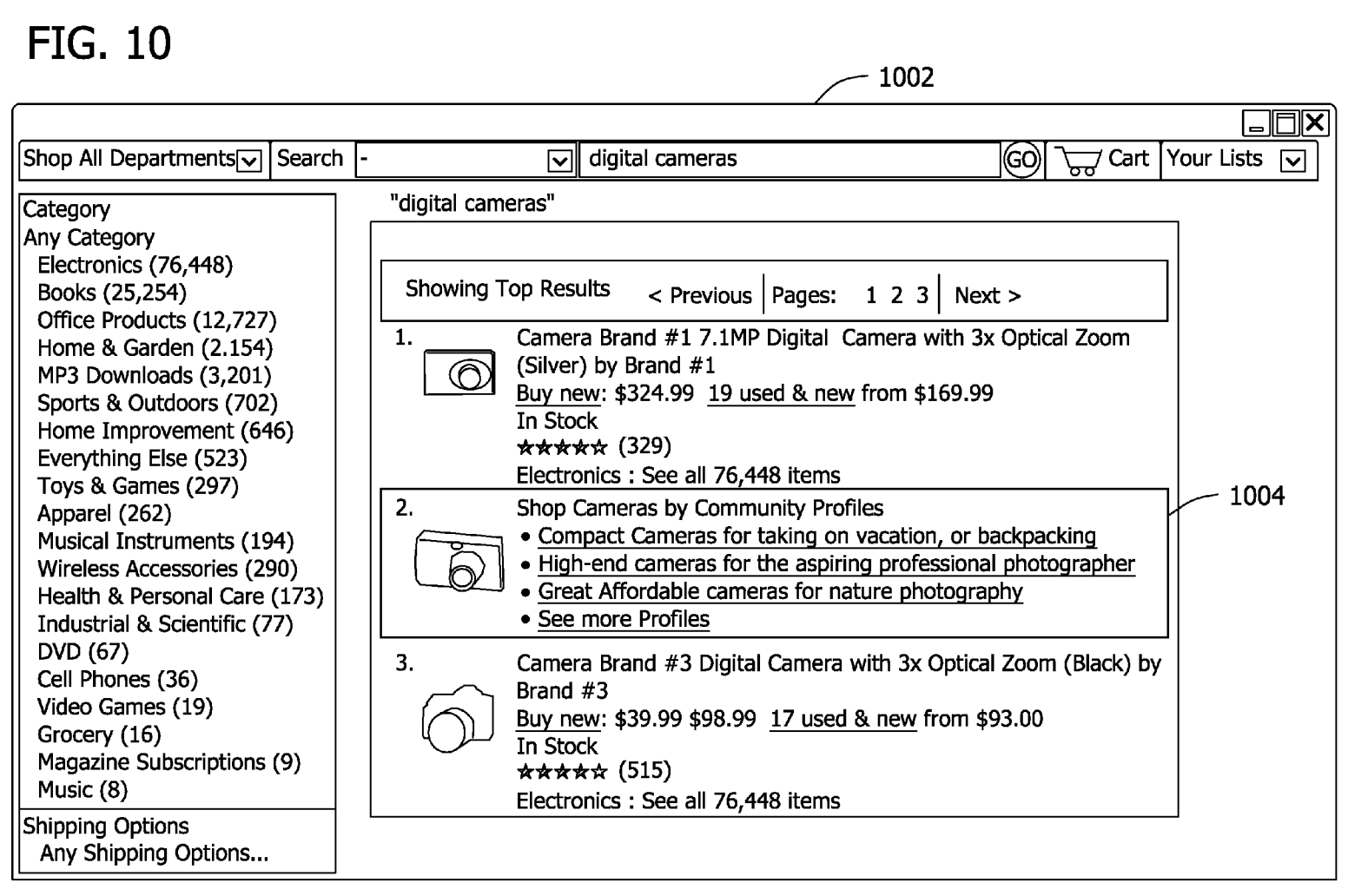

Referring next to FIG. 10, an example user interface 1002 illustrates profiles associated with product search results or search keywords. In the example of FIG. 10, the user 102 performs a product search using a term that, for example, is determined to be very broad. In this example, the search results are modified to include a portion 1004 of the user interface 1002 for displaying one or more of the profiles that are determined to be associated with the product search or with the search keywords. The modified search results are provided to the user 102. Such an embodiment aids users 102 who have entered broad or vague search terms by providing them with the opportunity to narrow their search based on one of the profiles.

Figure 3:
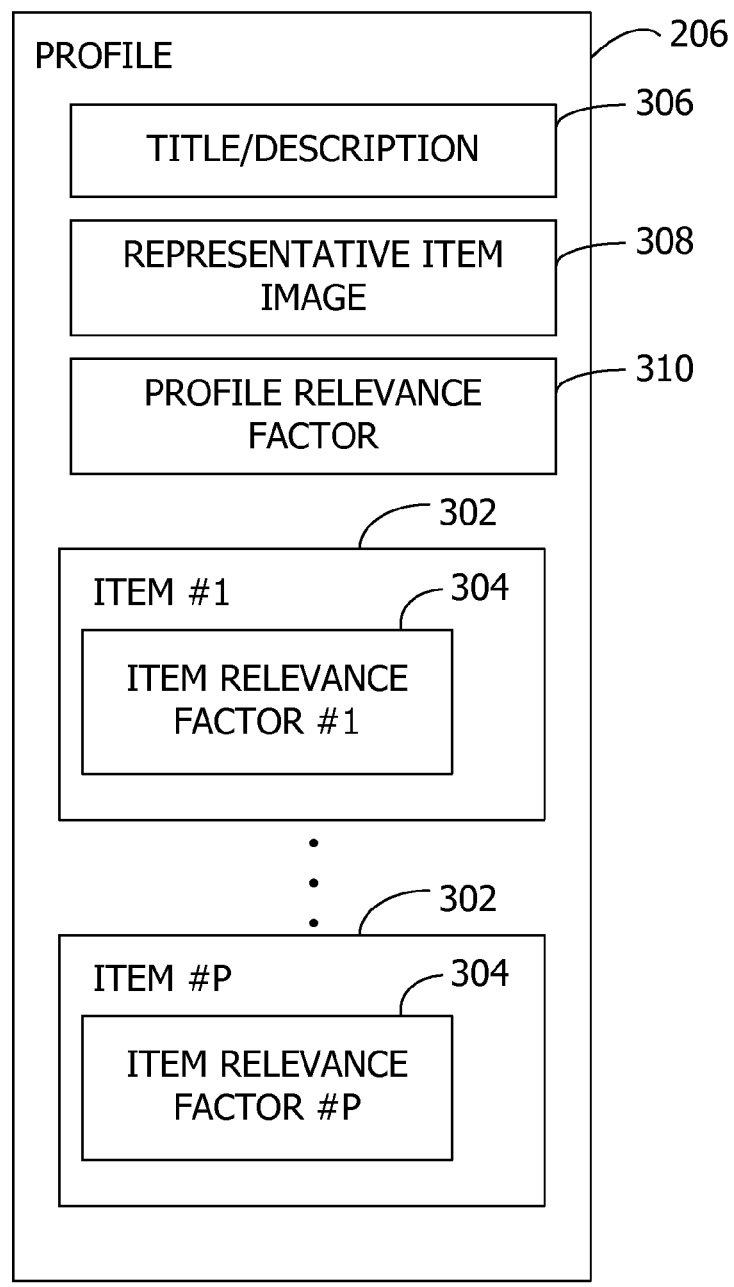
FIG. 3 is an example block diagram of one of the profiles storing items and corresponding item relevance factors.

Aspects of the invention determine which profiles to surface responsive to the search keywords by comparing the search keywords or product search results to the contents of each profile such as shown in FIG. 3. For example, profiles whose titles or descriptions match any of the search keywords are selected. Similarly, profiles whose items match any of the product search results are selected.

Figure 11:
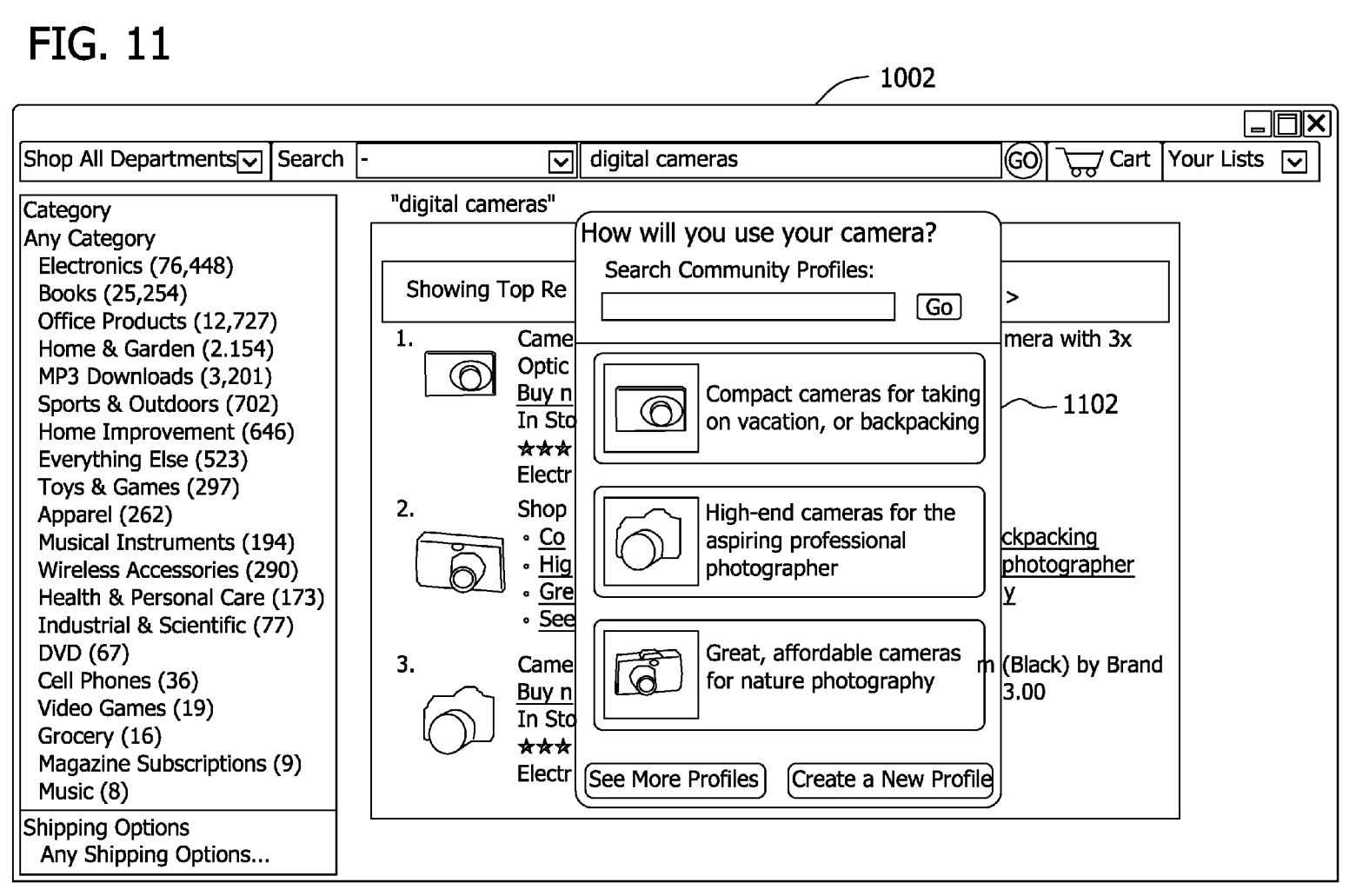

Referring next to FIG. 11, the user interface 1002 illustrates the profiles associated with product search results or the search keywords in an overlay 1102. The overlay 1102 appears in the user interface 1002 responsive to the user 102 entering a query to search for products. In the example of FIG. 11, a brief description of the profiles is provided along with the representative item images. A profile search feature is also included in the overlay 1102 enabling the user 102 to search for a particular profile based on, for example, keywords associated with the profiles.

Additional Examples

The following additional examples further describe aspects of the present disclosure. In an example, the user 102 browses for products, selects one of the profiles 206, and buys one of the products associated with the selected profile 206. For example, the user 102 decides to buy a new television. The user 102 browses televisions for sale at a web site, and is overwhelmed by the available choices. During the browsing, the user 102 notices a widget which, after clicking on the widget, presents a few profiles 206 (e.g., "best bang for the buck," "best plasma for a college dorm room," "best LCD TV for gaming," "high-end, large room, price not important," "best wall-mount TV for bedroom"). The user 102 selects one of the profiles 206, and is presented with a comparison grid of products that match the selected profile 206. The user 102 interacts with the products. For example, the user 102 deletes one of the products from the list, reorders the list of presented products, and adds one of the products to a shopping cart. Such interactions influence the profile relevance score for the selected profile 206.

In another example, the user 102 searches for products, selects one of the profiles 206, and buys one of the products associated with the selected profile 206. In this example, the user 102 enters a generic search query for "digital cameras," which returns an overwhelming quantity of products. In addition to the search results, however, a list of the profiles 206 associated with "digital cameras" is displayed. The user 102 selects one or more appropriate profiles 206 (e.g., "best cameras for little league games") and is taken directly to a comparison grid populated with a limited quantity of cameras (e.g., five cameras) associated with the selected profile 206. In embodiments in which the a plurality of the profiles 206 are chosen, the products associated with the selected profiles 206 are intersected to only list the products that are common to all the selected profiles 206. In other embodiments, a weighted selection of the products is listed. The user 102 reviews the products information, clicks on one of the representative item images 308, and adds the product to a shopping cart.

In still another example, the user 102 is a laptop expert who browses for laptops for sale. While browsing, the user 102 notices a widget offering to display the profiles 206 associated with laptops. The user 102 proceeds to browse the profiles 206, but does not find a suitable profile 206. The user 102 creates a new profile 206 and adds products to the profile 206 that the user 102 believes are appropriate. The new profile 206 is rotated in with the existing profiles 206, and statistics on the new profile 206 are gathered. For example, the click-through performance is measured and compared with the other profiles 206. Based at least on that data, the profile 206 is ranked against other laptop profiles and inserted into the ordering of the profiles 206 (e.g., via a king-of-the-hill algorithm).

In yet another example, the user 102 searches for products, selects one of the profiles 206, and adds one of the products to the selected profile 206. In this example, the user 102 notices that a particular brand of products is underrepresented in the selected profile 206. The user 102 selects and adds one of the products to the profile 206, and includes a note explaining why the added product is relevant to the profile 206. The updated profile 206 is immediately available to other users 102. Over time, as other users 102 associated with the selected profile 206 purchase the added product, move the added product higher (or to another more prominent position) in the list of products associated with the profiles 206, or explicitly vote that the added product is relevant to the profiles 206, the added product is displayed more prominently in the list of products associated with the profile 206. For example, the item relevance factor 304 for the added product may be based purely on sales rank or click-through performance, or based on a blend of sales rank and click-through performance to determine a location for the added product within a sort order for the list of products associated with the profile 206. That is, the products are not purely presented in order of sales rank. Rather, the products are presented in order of relevance to the profile 206, or based on a blend between the sales rank and the relevance. The added product may be removed from the list of products associated with the profile 206 if the overall sales rank or other performance metric for the added product drops below a predefined threshold.

In still another example, the items 302 are social or professional networking bios for people, and the profiles 206 represent sets of people of the same category or type. For example, the user 102 searches or browses bios for people with interests in preserving the environment, and is presented with a selection of profiles 206 in that category. Example profiles 206 include "Scrap Metal Recycler," "Preserving Animal Habitats," and "Biofuels." The user 102 selects the appropriate profile 206, and is presented with bios of people associated with the profile 206. The relevance of the selected profile 206 to the other profiles 206 is adjusted. In addition, as the user 102 interacts with the bios, the relevance of each of the bios within the profile 206 is adjusted based on the interactions.

Illustrative Operating Environment

A computing device or computer such as the server computing device 108 described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an illustrative computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute illustrative means for dynamically maintaining the association between one or more items 302 and the plurality of profiles 206. One technical effect is to dynamically maintain the association between one or more of the items 302 and the plurality of profiles 206 based on user interaction with the items 302. Another technical effect is to order or rank the profiles 206 relative to the other profiles 206, and order or rank the items 302 relative to the other items 302 in the profiles 206.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for community-based guided shopping, the method comprising:
   identifying a plurality of shopping profiles associated with a product category selected by a user via a user interface on a client, wherein each of the shopping profiles has a corresponding shopping profile weight factor and comprises one or more products, and wherein each of the one or more products has a corresponding product weight factor;
   selecting a respective shopping profile from the shopping profiles to be presented to the user via the user interface based at least in part on the corresponding shopping profile weight factors of the shopping profiles;
   obtaining a user selection via the user interface of the respective shopping profile presented to the user via the user interface;
   performing an automated selection of at least one of the one or more products associated with the respective shopping profile based at least in part on the corresponding product weight factors of the one or more products, the at least one of the one or more products to be presented to the user via the user interface;
   monitoring one or more user interactions with the user interface when the user interface includes content associated with the at least one of the one or more products;
   determining, via a processor, an interaction weight for each of the one or more user interactions; and
   based at least in part on the interaction weight for each of the one or more user interactions, increasing or decreasing, via the processor, the corresponding shopping profile weight factor for the respective shopping profile and the corresponding product weight factor for the at least one of the one or more products within the respective shopping profile.

2. The method of claim 1, wherein the shopping profiles represent purchase and usage profiles.

3. The method of claim 1, further comprising dynamically maintaining the respective shopping profile based at least in part on the one or more user interactions, wherein dynamically maintaining the respective shopping profile includes at least one of the following: adding one or more additional products to the respective shopping profile, removing a respective product from the one or more products associated with the respective shopping profile, or altering a prominence of the respective product from the one or more products associated with the respective shopping profile.

4. A computer-implemented method comprising:
   identifying, by a computing device, one or more shopping profiles associated with an item category, wherein each of the one or more shopping profiles has a corresponding shopping profile weight factor and comprises one or more items, and wherein each of the one or more items has a corresponding item weight factor;
   obtaining, by the computing device, a profile selection of a respective shopping profile from a set of the one or more shopping profiles presented to a user via a user interface on a client, wherein the set of the one or more shopping profiles includes at least one of the one or more shopping profiles and is determined via an automated selection process;
   selecting, by the computing device, at least one provided item of the one or more items associated with the respective shopping profile, the at least one provided item to be presented to the user via the user interface;
   monitoring, by the computing device, one or more user actions with the user interface when the user interface includes the at least one provided item;
   determining, by the computing device, a weight for the one or more user actions; and
   based on the weight for the one or more user actions, increasing or decreasing, by the computing device, the corresponding shopping profile weight factor for the respective shopping profile and the corresponding item weight factor of the at least one provided item.

5. The computer-implemented method of claim 4, wherein monitoring the one or more user actions comprises one or more of the following: storing a purchase history of the user, storing a browsing history of the user, or analyzing the one or more user actions.

6. The computer-implemented method of claim 4, further comprising receiving feedback from the user regarding a relevance of the at least one provided item of the respective shopping profile, and modifying the at least one provided item based on the feedback.

7. The computer-implemented method of claim 6, wherein modifying the one or more items comprises adding or removing a respective item from the one or more items.

8. The computer-implemented method of claim 4, wherein identifying the one or more shopping profiles comprises:
   receiving a query from the user; and
   performing the query to identify the one or more shopping profiles.

9. The computer-implemented method of claim 4, further comprising sorting the one or more shopping profiles based on one or more of the following: a popularity, a click-through performance, a quantity of views, or a purchase history.

10. The computer-implemented method of claim 4, wherein the at least one provided item is presented via the user interface by a comparison of the at least one provided item in a grid.

11. The computer-implemented method of claim 4, further comprising:
   obtaining an item selection of a respective item from the at least one provided item; and
   providing item information of the item selection of the respective item responsive to obtaining the item selection of the respective item.

12. The computer-implemented method of claim 4, further comprising defining a relevance factor for each of the one or more items, wherein the relevance factor indicates a relationship of the one or more items with respect to each other.

13. The computer-implemented method of claim 12, wherein the relevance factor is based on a sales rank.

14. A system comprising:
   a memory area for storing a plurality of shopping profiles, the shopping profiles being associated with a plurality of item categories, each of the shopping profiles comprising a corresponding shopping profile weight factor and one or more profile specific items from a plurality of items, and each of the items having a corresponding item weight factor; and
   a processor configured to:
      receive a notification of one or more actions performed by a user interacting with a respective one of the items displayed in a user interface;
      identify a respective one of the item categories associated with the respective one of the items with which the user interacted;
      identify at least one of the shopping profiles associated with the respective one of the item categories;
      provide an ordered at least one of the shopping profiles to present to the user via the user interface, wherein the ordered at least one of the shopping profiles is based at least in part on the corresponding shopping profile weight factor associated with each of the at least one of the shopping profiles;
      determine, via the processor, a weight for each of the one or more actions performed by the user; and
      based on the weight for each of the one or more actions, increase or decrease the corresponding shopping profile weight factor for the at least one of the shopping profiles and the corresponding item weight factor associated with the respective one of the items interacted with by the user.

15. The system of claim 14, wherein the one or more actions performed by the user comprise one or more of the following: viewing the respective one of the items, purchasing the respective one of the items, or providing the corresponding item weight factor for the respective one of the items.

16. The system of claim 14, wherein the processor is further configured to automatically select one of the at least one of the shopping profiles based on a purchase history of the user.

17. The system of claim 14, wherein the items comprise one or more of the following: a product, a service, a news article, or a personal profile.

18. The system of claim 14, wherein each respective one of the shopping profiles comprises a description of the respective one of the shopping profiles, a representative item image, and a list of the one or more profile specific items.

19. The system of claim 14, wherein the processor is further configured to receive an adjustment to the corresponding item weight factor from the user and to adjust the corresponding item weight factor based on the adjustment.

20. The system of claim 14, wherein the processor is further configured to increase the corresponding item weight factor of the one of the items based on the notification.

21. The system of claim 14, wherein the processor is further configured to decrease the corresponding item weight factor of the one of the items based on the notification.

22. The system of claim 14, wherein the processor is further configured to dynamically maintain an association between the one or more profile specific items and the shopping profiles.

23. A non-transitory computer-readable medium embodying a program executable in at least one computing device, comprising:
   code that selects a respective shopping profile from a plurality of shopping profiles to be presented to a user via a user interface on a client based at least in part on a plurality of shopping profile weight factors associated with the shopping profiles, wherein the respective shopping profile includes a plurality of items, and wherein a plurality of item weight factors are associated with the items;
   code that obtains a selection by the user via the user interface of the respective shopping profile;
   code that performs an automated selection of at least one of the items to present to the user on the user interface based at least in part on the item weight factors associated with the items;
   code that monitors at least one user interaction on the user interface presenting the at least one of the items to the user; and
   code that modifies both a corresponding one of the shopping profile weight factors of the respective shopping profile and at least one of the item weight factors corresponding to the at least one of the items in response to the at least one user interaction.

24. The non-transitory computer-readable medium of claim 23, further comprising code that ranks the shopping profiles based at least in part on the shopping profile weight factors associated with the shopping profiles.

25. The non-transitory computer-readable medium of claim 23, further comprising code that ranks the items based at least in part on the item weight factors associated with the items.

* * * * *

UNITED STATES PATENT AND TRADEMARK OFFICE
CERTIFICATE OF CORRECTION

PATENT NO. : 8,577,753 B1
APPLICATION NO. : 12/256279
DATED : November 5, 2013
INVENTOR(S) : Brent Allen Vincent, Ralph Howard Edson, III and Sean M. Scott It is certified that error appears in the above-identified patent and that said Letters Patent is hereby corrected as shown below:

In the Claims

Column 11, line 5: replace "modifying the one or more items" with -- modifying the at least one provided item --

Signed and Sealed this
Twenty-fourth Day of March, 2015

Michelle K. Lee
*Director of the United States Patent and Trademark Office*